US012584565B2

(12) United States Patent
Slayzak et al.

(10) Patent No.: US 12,584,565 B2
(45) Date of Patent: Mar. 24, 2026

(54) EVAPORATIVE COOLER OPERABLE IN A RANGE OF MOUNTING ANGLES

(71) Applicant: Seeley International Pty Ltd, Lonsdale (AU)

(72) Inventors: Steven Slayzak, Denver, CO (US); Shane Antony Harris, Glenelg South (AU); Daniel Robert Haynes, Park Holme (AU); Ian Howard Pendergrast, Woodcroft (AU)

(73) Assignee: Seely International Pty Ltd, Lonsdale (AU)

( * ) Notice: Subject to any disclaimer, the term of this patent is extended or adjusted under 35 U.S.C. 154(b) by 489 days.

(21) Appl. No.: 17/612,654

(22) PCT Filed: May 20, 2019

(86) PCT No.: PCT/US2019/033183
§ 371 (c)(1),
(2) Date: Nov. 19, 2021

(87) PCT Pub. No.: WO2020/236152
PCT Pub. Date: Nov. 26, 2020

(65) Prior Publication Data
US 2022/0213976 A1 Jul. 7, 2022

(51) Int. Cl.
*F16K 31/26* (2006.01)
*F16K 31/34* (2006.01)
*F28F 25/02* (2006.01)

(52) U.S. Cl.
CPC .............. *F16K 31/26* (2013.01); *F16K 31/34* (2013.01); *F28F 25/02* (2013.01)

(58) Field of Classification Search
CPC ........ F16K 31/26; F16K 31/34; F16K 31/265; F16K 31/523; F16K 33/00; F28F 25/02;
(Continued)

(56) References Cited

U.S. PATENT DOCUMENTS

| | | | |
|---|---|---|---|
| 542,485 A | 7/1895 | Menzies | |
| 2,413,138 A * | 12/1946 | Feinberg | F28F 25/02 |
| | | | 210/123 |

(Continued)

FOREIGN PATENT DOCUMENTS

| | | |
|---|---|---|
| JP | S4728251 U | 11/1972 |
| JP | S59116680 U | 8/1984 |
| WO | 2020236152 A1 | 11/2020 |

OTHER PUBLICATIONS

International Search Report and Written Opinion for PCT/US2019/033183, mailed on Jul. 18, 2019 from the USPTO as International Searching Authority (3 pages).

*Primary Examiner* — Craig M Schneider
*Assistant Examiner* — Andrew J Rost
(74) *Attorney, Agent, or Firm* — Koenig IP Works, PLLC; Katherine Koenig

(57) ABSTRACT

Evaporative coolers and components therefor that may be used at any of a variety of mounting angles without compromising function or requiring complex and custom adjustments based on a particular mounting angle. In one embodiment, a reservoir for an evaporative cooler includes a water collection basin, a float valve assembly including a float valve housing, a float valve, a lift arm pivotably coupled to the float valve, and a float coupled to the lift arm, a pump, and a drain valve, the pump and the drain valve each being within the water collection basin.

7 Claims, 13 Drawing Sheets

(58) Field of Classification Search
CPC .... F24F 2006/008; F24F 5/0035; F24F 13/30;
F24F 13/32; E03C 1/021; F28D 5/00
USPC ........................................................ 137/356
See application file for complete search history.

(56) References Cited

U.S. PATENT DOCUMENTS

| | | | | |
|---|---|---|---|---|
| 2,874,928 A * | 2/1959 | Adams | .................... | F16K 31/24 |
| | | | | 251/120 |
| 4,289,713 A * | 9/1981 | Goettl | ..................... | F24F 6/04 |
| | | | | 137/143 |
| 4,312,819 A * | 1/1982 | Leyland | ................... | F28D 5/00 |
| | | | | 261/36.1 |
| 4,369,148 A * | 1/1983 | Hawkins | ................... | F24F 6/04 |
| | | | | 261/36.1 |
| 4,400,185 A | 8/1983 | Goettl | | |
| 4,573,490 A * | 3/1986 | Kaletsky | ................. | F24F 6/04 |
| | | | | 261/36.1 |
| 4,687,604 A | 8/1987 | Goettl | | |
| 4,815,297 A * | 3/1989 | Kelley | .................... | F24F 6/04 |
| | | | | 62/91 |
| 4,819,448 A * | 4/1989 | Bardo | .................... | F24F 13/32 |
| | | | | 62/304 |
| 5,192,464 A * | 3/1993 | Pawlowski | ............ | F24F 6/043 |
| | | | | 415/13 |
| 5,533,545 A | 7/1996 | Robinson | | |
| 5,857,350 A * | 1/1999 | Johnson | ................... | F28D 5/00 |
| | | | | 261/106 |
| 5,921,101 A * | 7/1999 | Wang | .................... | F24F 5/0035 |
| | | | | 62/305 |
| 5,956,964 A * | 9/1999 | Wright | ................. | F24F 5/0035 |
| | | | | 261/36.1 |
| 6,101,831 A * | 8/2000 | Ciccone | ................... | F24F 1/04 |
| | | | | 62/310 |
| 6,206,337 B1 | 3/2001 | Veillet | | |
| 6,240,954 B1 | 6/2001 | Bereznai | | |
| 6,332,332 B1 * | 12/2001 | O'Brien | ................. | F24F 13/32 |
| | | | | 62/304 |
| 6,338,461 B1 * | 1/2002 | Wallace | ................ | F24F 5/0035 |
| | | | | 52/27 |
| 2006/0080764 A1 | 4/2006 | Raubenheimer | | |
| 2013/0220906 A1 | 8/2013 | Stenhouse | | |

* cited by examiner

EVAPORATIVE COOLER OPERABLE IN A RANGE OF MOUNTING ANGLES

CROSS-REFERENCE TO RELATED APPLICATIONS

This Application is a U.S. National Phase Entry under 35 U.S.C. § 371 of International App. No. PCT/US2019/033183, filed May 20, 2019, entitled EVAPORATIVE COOLER OPERABLE IN A RANGE OF MOUNTING ANGLES, the entirety of which is incorporated herein by reference.

TECHNICAL FIELD

This disclosure relates to evaporative coolers and components therefor that may be used at any of a variety of mounting angles without compromising function or requiring complex and custom adjustments based on a particular mounting angle.

BACKGROUND

Evaporative coolers reduce the temperature of air through direct and/or indirect evaporative cooling. For example, in direct evaporative coolers (also referred to as "swamp coolers"), air is drawn through the sides of the cooler's housing and over one or more wet evaporative media mads, which causes evaporation of at least some of the water on and/or within the evaporative media pad(s) and reduces the temperature of the passing air.

To wet the evaporative media pad(s), evaporative coolers also include a water distribution system. Typically, water from a reservoir at the bottom of the evaporative cooler is drawn to the top of the evaporative cooler by a pump, from where the water is then distributed by gravity toward the evaporative media pad(s). Water that exits or falls from the evaporative media pad(s) is collected within the reservoir and recirculated through the system by the pump.

Water is gradually depleted from the reservoir during normal operation, due at least in part to evaporative loss from the evaporative media pad(s). As is discussed in greater detail herein, the evaporative cooler may include a float valve, a water level sensor, and/or other means for monitoring and regulating the amount of water available for circulation through the water distribution system. Too much water within the reservoir is wasteful and may lead to leaks and too little water does not adequately wet the evaporative media pad(s) and may result in inefficient cooling.

Most currently known evaporative coolers include a float valve assembly that includes a float valve, a lift arm coupled to the float valve, and a float coupled to the end of the lift arm. The float valve assembly is configured such that the float valve is mounted to an interior wall of the evaporative cooler at a distance above the water line and float sits on the surface of the water within the reservoir and rises and falls with the water level. If the water level drops, the float lowers with the water level and causes the float valve to open to allow water to flow into the reservoir. When the water level reaches a pre-determined shut-off level, the float valve closes.

However, as the float follows the surface of the water, the mounting angle of the evaporative cooler (and, therefore, the reservoir) affects the distribution of water within the reservoir and, consequently, may change the water level proximate the float of the float valve differently than in other areas of the reservoir. For example, a steep mounting angle causes the water within the reservoir to pool at the lower end of the reservoir and leaves the upper end of the reservoir with less water. Depending on the location of the float, this may cause the float valve to register a different amount of water than is actually present in the reservoir, which can lead to overflows, leaks, and/or wasted expense if the float valve opens to add more water than is needed (that is, if the float valve falsely registers a water level below the pre-determined shut-off level). Conversely, this may lead to inefficient cooling and malfunction if the float valve closes to prevent the addition of water (that is, if the float valve falsely registers a water level at or above the pre-determined shut-off level).

Therefore, currently known evaporative coolers often malfunction and/or do not cool efficiently if mounted to a roof or other surface having an angle or slope other than horizontal or substantially horizontal (for example, 0°±3°). Additionally, even if a currently known evaporative cooler is configured for proper operation when mounted at an angle other than horizontal or substantially horizontal, the evaporative cooler is configured for proper operation only at a specific mounting angle or narrow range of mounting angles, and is not suitable for use at any of a wide range of mounting angles.

Further, currently known evaporative coolers include a drain pipe for emptying the reservoir and/or to remove overflow water. However, these drain pipes typically extend over the surface of the roof, which not only makes them vulnerable to damage and detachment from the cooler, but are also unsightly. Some evaporative coolers may include drain pipes that pass through the roof to a sub-roof or interior of the building, but the drain pipe connection, and hole made in the roof to accommodate the drain pipe, must be configured for the particular mounting angle of the evaporative cooler. Therefore, a single drain pipe connection cannot be used for use at any of a wide range of mounting angles.

SUMMARY

In one embodiment, a reservoir for an evaporative cooler includes: a water collection basin; a float valve assembly including a float valve housing, a float valve, a lift arm pivotably coupled to the float valve, and a float coupled to the lift arm; a pump; and a drain valve, the pump and the drain valve each being within the water collection basin.

In one aspect of the embodiment, the water collection basin is elongate and extends from a first edge of the reservoir to a second edge of the reservoir opposite the first edge, the water collection basin having a width of approximately 140 mm.

In one aspect of the embodiment, the reservoir includes a first end and a second end opposite the first end, the first end being configured to be closer to an edge of a roof when the reservoir is mounted to the roof and the second end being configured to be closer to an apex of the roof when the reservoir is mounted to the roof, the water collection basin extending along the first end.

In one aspect of the embodiment, the water collection basin lies along an axis of rotation of the reservoir, the water collection basin being configured to contain a volume of water when the reservoir is rotated along the axis of rotation to lie at any of a plurality of angles relative to horizontal.

In one aspect of the embodiment, the plurality of angles includes angles between approximately 10° and approximately 40°.

In one aspect of the embodiment, the float is configured to float on a surface of water within the water collection basin.

In one aspect of the embodiment, the float valve housing is coupled to the reservoir at a location proximate the water collection basin.

In one aspect of the embodiment, the reservoir further comprises at least one sensor within the water collection basin.

In one embodiment, a float valve assembly comprises: a float valve housing, the float valve housing including a first end and a second end opposite the first end; a float valve within the second end of the float valve housing; a push rod movable within the float valve housing, the push rod having a first end and a second end opposite the first end; a plunger coupled to the second end of the push rod; a lift arm, the lift arm including a first end pivotably coupled to the first end of the push rod at a pivot point and a second end opposite the first end; and a float coupled to the second end of the lift arm, the first end of the float valve housing being configured to be coupled to a floor of a reservoir such that the pivot point is located at or proximate a surface of water within the reservoir.

In one aspect of the embodiment, the float is removably coupled to the second end of the lift arm.

In one aspect of the embodiment, the second end of the lift arm includes a first plurality of engagement elements and the float includes a second plurality of engagement elements complementary to the first plurality of engagement elements.

In one aspect of the embodiment, each of the first plurality of engagement elements has a trough shape with a free edge extending in a first direction and each of the second plurality of engagement elements has a trough shape with a free edge extending in a second direction opposite the first direction.

In one aspect of the embodiment, the float valve assembly further comprises: a solenoid valve in fluid communication with the float valve; and a solenoid valve shroud positionable over the solenoid valve.

In one aspect of the embodiment, the solenoid valve shroud includes: a first end having a first aperture; a second end opposite the first end and having a second aperture; and an internal chamber.

In one aspect of the embodiment, the second aperture is sized to pass over the solenoid valve to at least partially enclose the solenoid valve within the internal chamber, the solenoid valve shroud being configured to direct a flow of water toward the reservoir.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
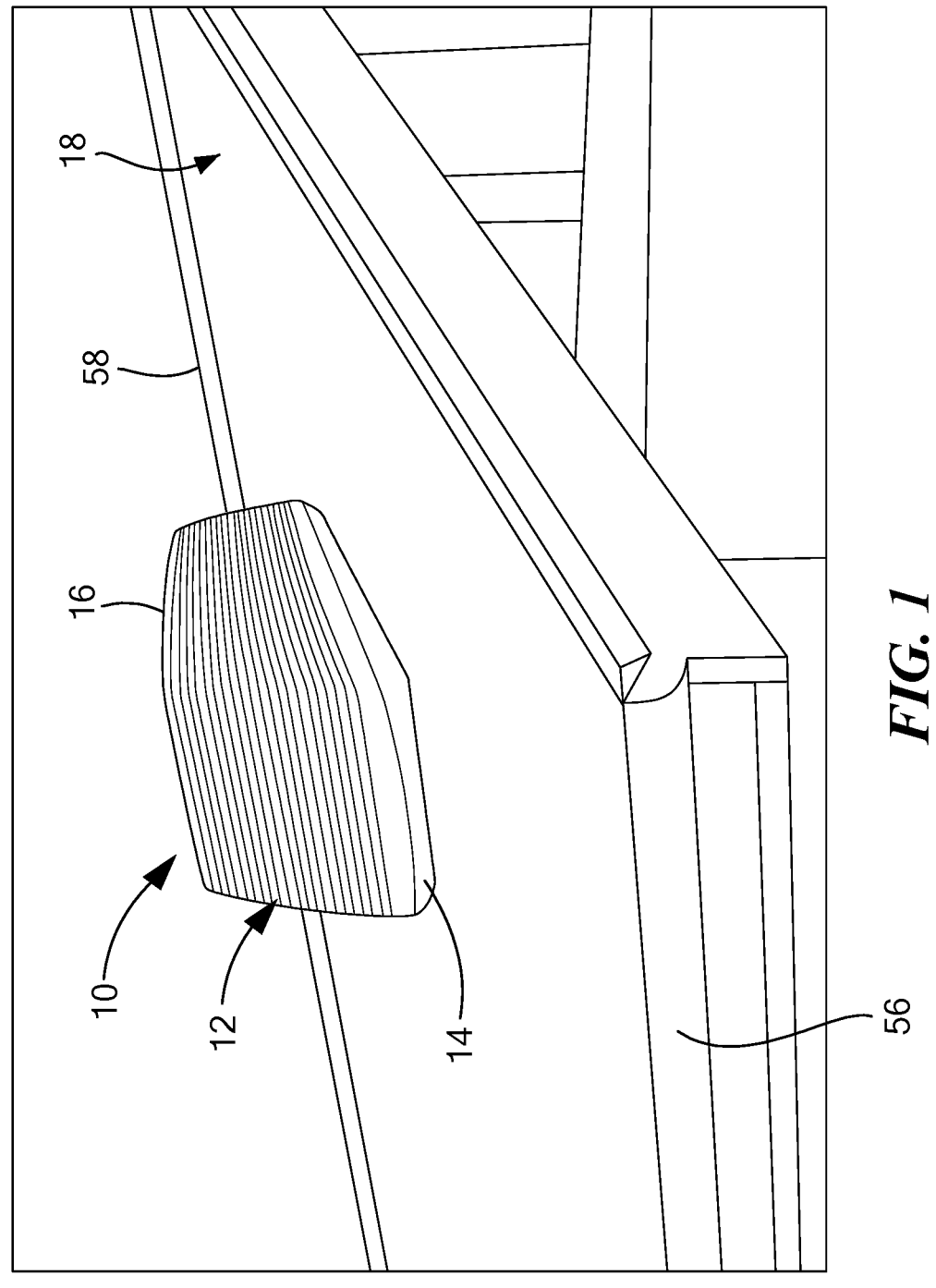
FIG. 1 shows an exemplary evaporative cooler in accordance with the present disclosure.
Figure 2:
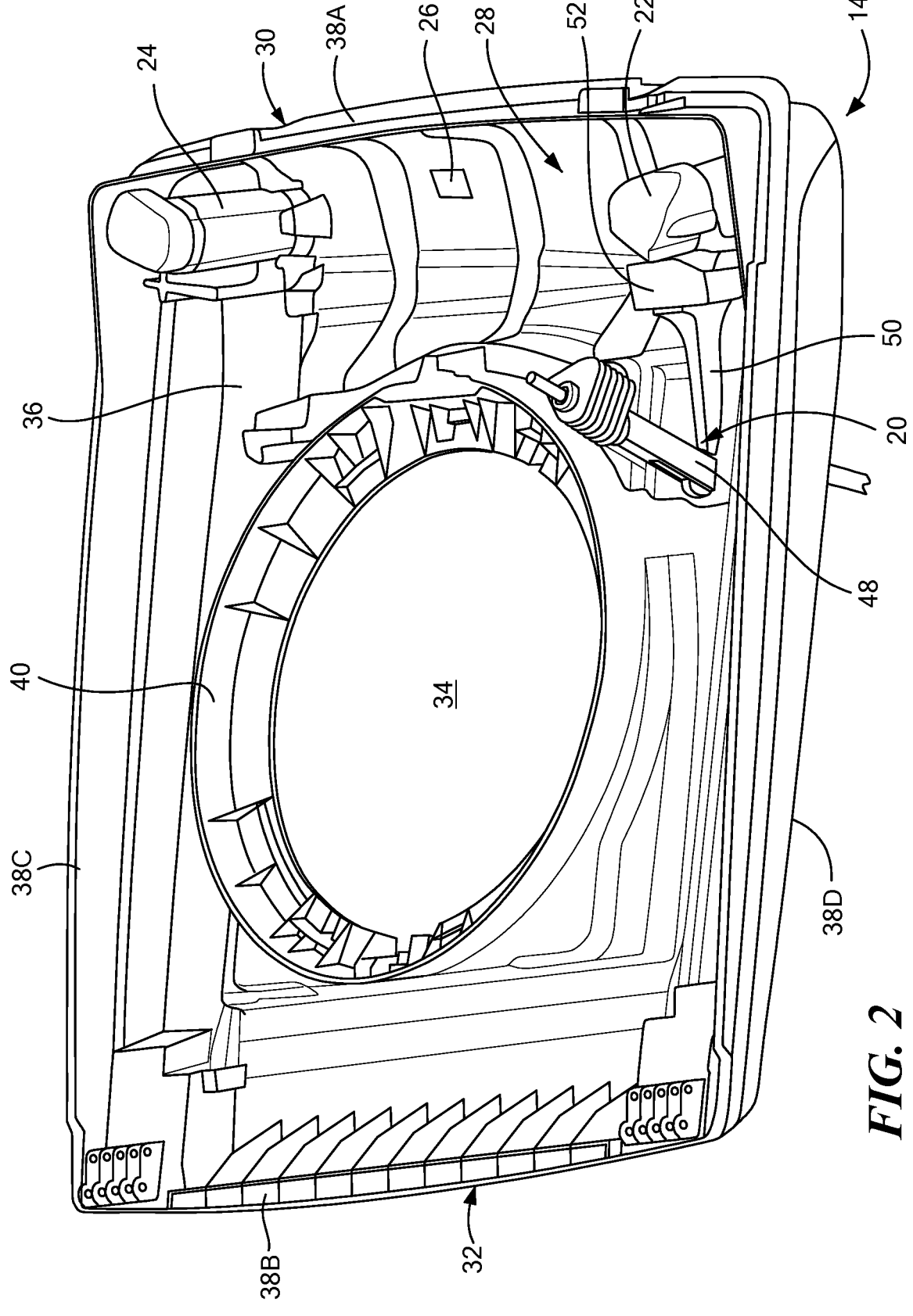
FIG. 2 shows a perspective view of a reservoir of the evaporative cooler in accordance with the present disclosure, the reservoir containing at least one evaporative cooler component.

The system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. As used herein, relational terms such as "first" and "second," "top and bottom," and the like may be used solely to distinguish one component or element from another component or element without necessarily requiring or implying any physical or logical relationship or order between such components or elements.

Referring now to FIG. 1, an exemplary evaporative cooler 10 is shown. In one embodiment, the evaporative cooler 10 generally includes a housing 12, which includes a reservoir 14 and a lid 16 removably coupled to the reservoir 14. Although not shown in FIG. 1, the evaporative cooler 10 in one embodiment also includes at least one evaporative media pad, a fan, a motor, and a water distribution system. The reservoir 14 and components of the evaporative cooler 10, which may be part of the water distribution system, are shown and discussed in greater detail below. The evaporative cooler 10 is shown in FIG. 1 mounted to a roof 18 having a slope (that is, the roof is not a horizontal or substantially horizontal surface), the reservoir 14 being positioned parallel, or at least substantially parallel, to the roof 18. Thus, in some embodiments, the reservoir 14 is oriented in a non-horizontal position when the evaporative cooler 10 is in use.

Referring now to FIGS. 2-7, a reservoir 14 and components of the evaporative cooler 10 are shown. In one embodiment, a float valve assembly 20, a pump 22, a drain valve 24, and at least one sensor 26 are located within the reservoir 14. However, it will be understood that the evaporative cooler 10 may include more or fewer components, including within the reservoir 14 and/or within the housing 12 An evaporative cooler 10 including the reservoir 14 and components positioned as shown in FIGS. 2-7 is configured for use at any of a wide range of mounting angles within approximately 10° and approximately 40° (±5°) while still allowing the float valve assembly 20 to accurately react to the water level within the reservoir 14 and to maintain an adequate amount of water within the reservoir 14 without waste. In particular, as is shown and described herein, at least a portion of the float valve assembly 20, the pump 22, the drain valve 24, and the at least one sensor 26 are aligned with and/or within a water collection basin 28 that extends across one end of the reservoir 14. These components 20, 22, 24, 26 and the water collection basin 28 are referred to herein as being functionally aligned for accurate water supply management within the evaporative cooler 10.

Referring now to FIGS. 2-5, the reservoir 14 generally includes a first end 30, a second end 32 opposite the first end 30, and a dropper aperture 34. In one embodiment, the dropper aperture 34 is between the first end 30 and the second end 32, at or proximate a middle point of the reservoir 14. The reservoir 14 also includes a floor 36 substantially lying in a first plane and being bordered by an outer wall 38 extending from the floor 36. In one embodiment, the dropper aperture 34 is also bordered or circumscribed by an inner wall 40 extending from the floor 36. For example, at least a portion of each of the walls 38, 40 may extend perpendicularly, or at least substantially perpendicularly, from the plane in which the floor 36 lies in order to retain a volume of water 42 within the reservoir 14. In one embodiment, the outer wall 38 includes a first wall portion 38A, a second wall portion 38B opposite the first wall portion 38A, a third wall portion 38C extending between the first and second wall portions 38A, 38B, and a fourth wall portion 38D opposite the third wall portion 38C and extending between the first and second wall portions 38A, 38B.

Figure 6:
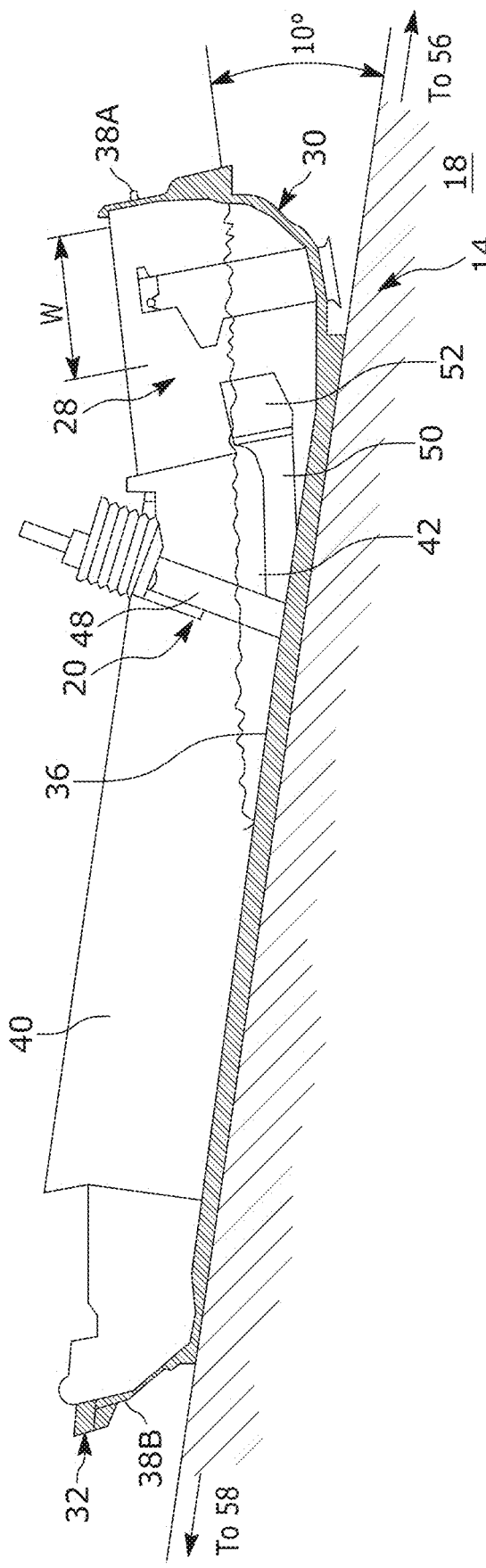
FIG. 6 shows a cross-sectional view of the reservoir of FIGS. 2 and 3 in accordance with the present disclosure, the reservoir being positioned at a first angle relative to horizontal.
Figure 7:
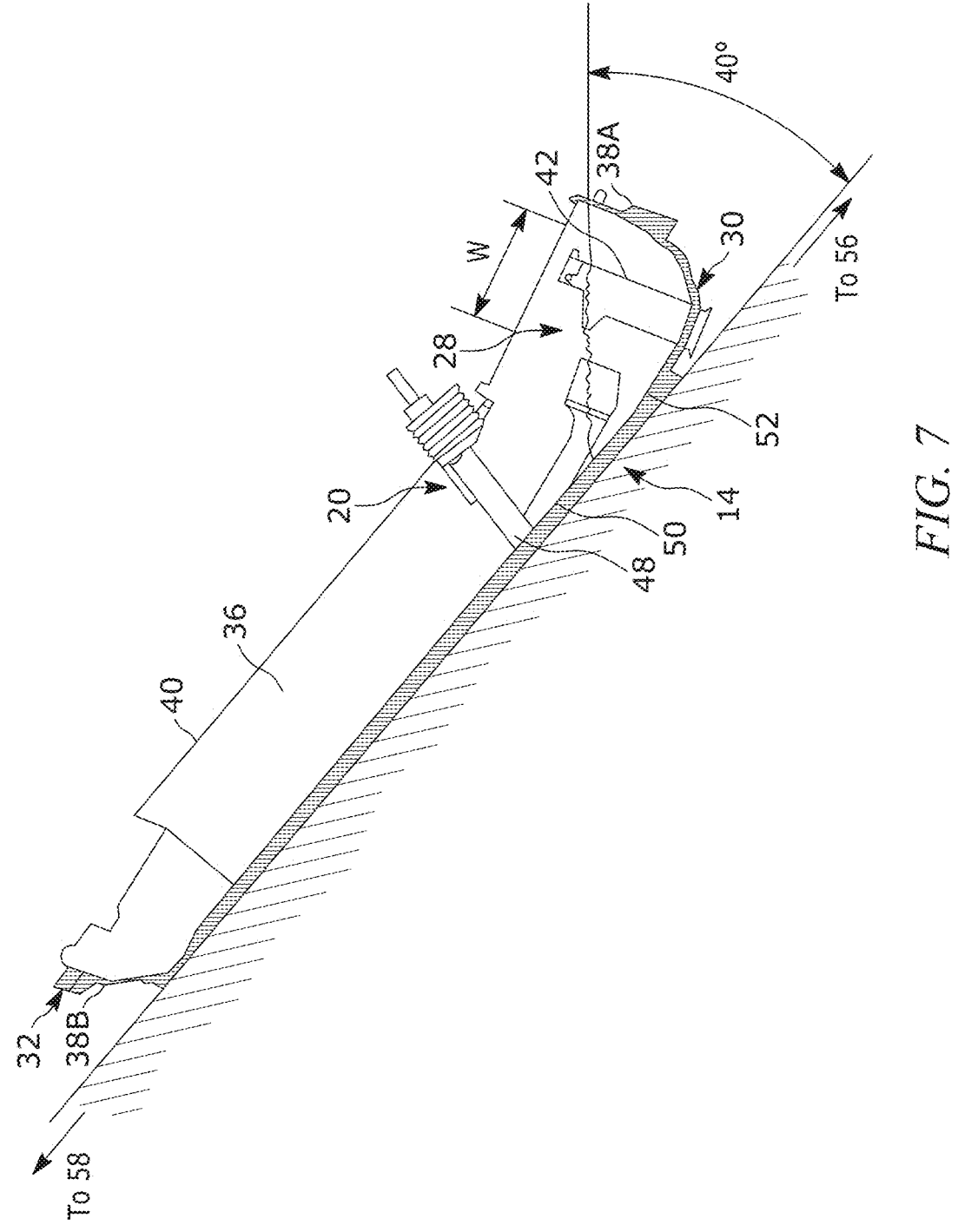
FIG. 7 shows a cross-sectional view of the reservoir of FIGS. 2 and 3 in accordance with the present disclosure, the reservoir being positioned at a second angle relative to horizontal.

Continuing to refer to FIGS. 2-5, in one embodiment the first end 30 of the reservoir 14 includes an elongate water collection basin 28, which is at least partially defined by the floor 36 of the reservoir 14. For example, in one embodiment at least a portion of the floor 36 of the first end 30 of the reservoir 14 is concave to define the water collection basin 28. In another embodiment, the water collection basin 28 is not defined by a concavity in the floor 36 of the reservoir 14, but the first wall portion 38A has a height that is greater than a height of the second wall portion 38B and is oriented at least slightly toward the second end 32, which allows the portion of the reservoir 14 proximate the first wall portion 38A to collect water 42 as the reservoir 14 is rotated about an axis of rotation 44 for mounting to a non-horizontal surface (as shown in FIGS. 6 and 7). Further, in one embodiment the water collection basin 28 extends generally parallel to the first wall portion 38A and extends from the third wall portion 38C to the fourth wall portion 38D. Put another way, the water collection basin 28 is an elongate trough that extends along the front edge of the reservoir 14 and between the left and right sides of the reservoir 14. Further, in one embodiment the water collection basin 28 has a width W of approximately 140 mm (±10 mm).

Figure 3:
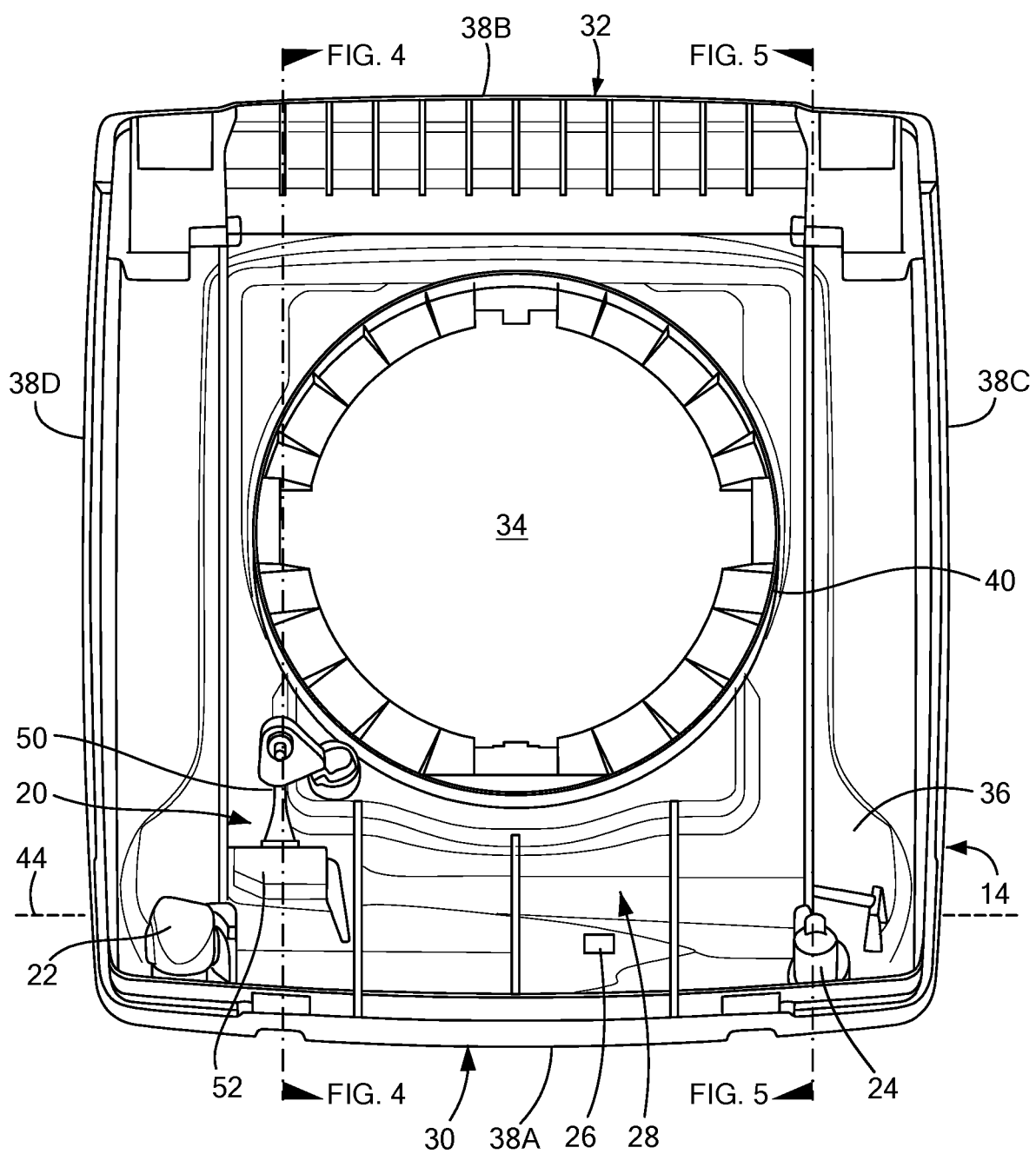
FIG. 3 shows a plan view of the reservoir of FIG. 2 in accordance with the present disclosure.
Figure 4:
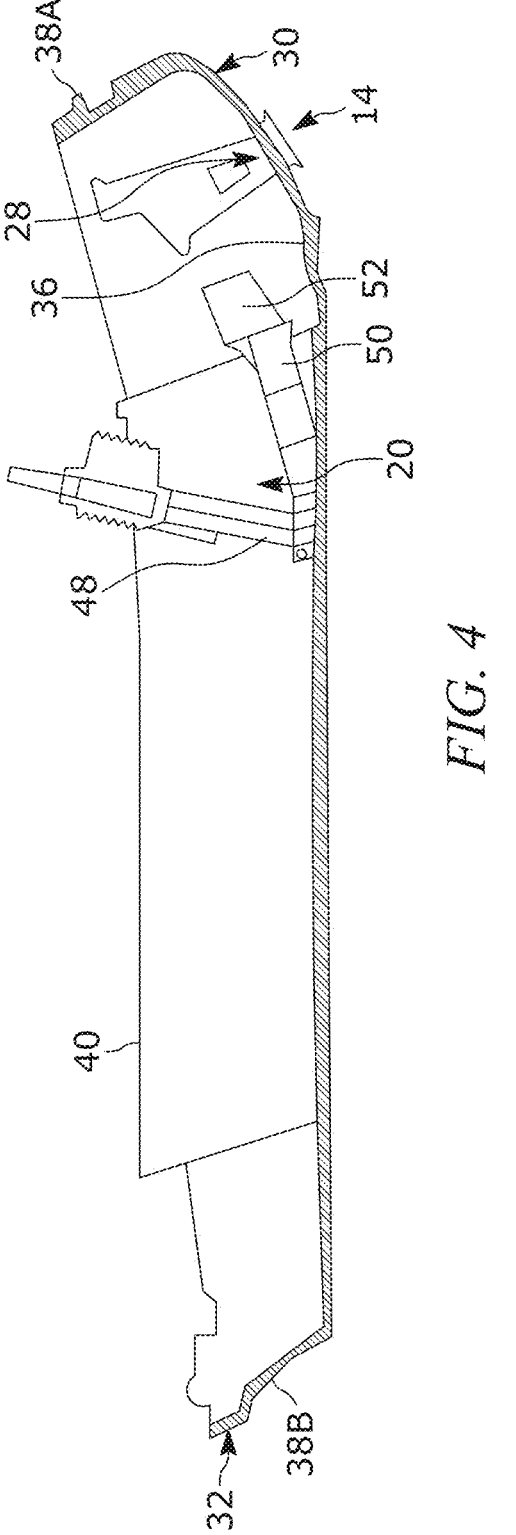
FIG. 4 shows a first cross-sectional view of the reservoir of FIGS. 2 and 3 in accordance with the present disclosure
Figure 5:
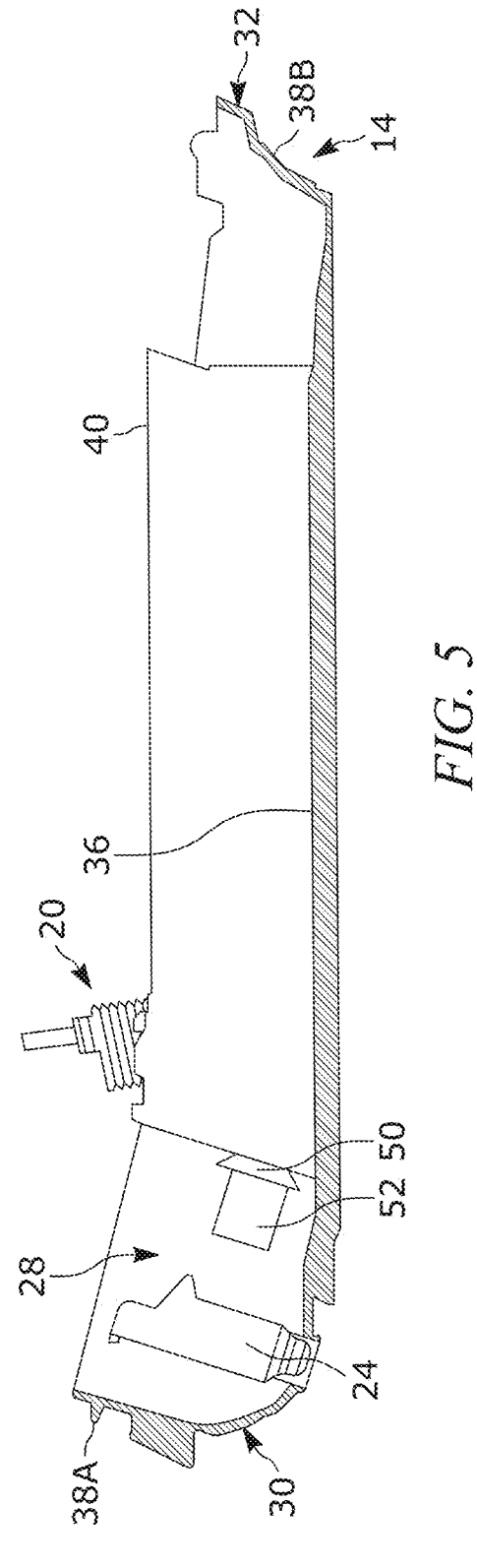
FIG. 5 shows a second cross-sectional view of the reservoir of FIGS. 2 and 3 in accordance with the present disclosure.

Continuing to refer to FIGS. 2-5, in one embodiment the pump 22, the at least one sensor 26, the drain valve 24, and at least a first portion of the float valve assembly 20 are coupled to and/or located within the reservoir 14 at locations within and/or aligned with the water collection basin 28, and at least a second portion of the float valve assembly 20 is located proximate the water collection basin 28. However, it will be understood that an entirety of the float valve assembly 20 be located within the reservoir 14 at one or more locations within and/or aligned with the water collection basin 28. In one embodiment, the drain valve 24 and the pump 22 are horizontally aligned in an axis at least substantially parallel to the first wall portion 38A of the reservoir 14 (for example, as shown in FIG. 3). In one embodiment, the at least one sensor 26 includes at least one of a water level sensor, salinity sensor, and a pH sensor.

Figure 9:
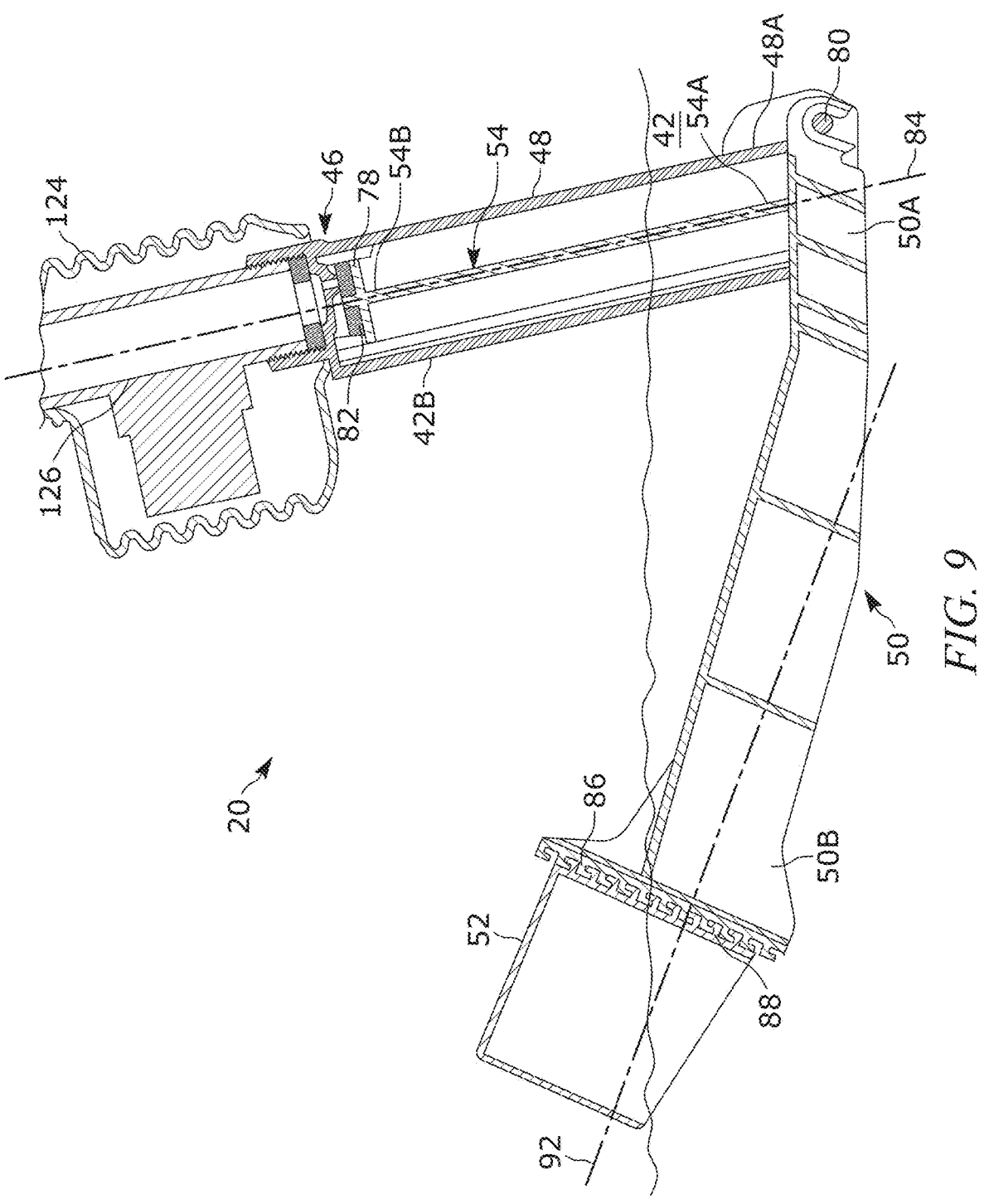
FIG. 9 shows a cross-sectional view of an exemplary float valve assembly in accordance with the present disclosure.

Continuing to refer to FIGS. 2-5, in one embodiment the float valve assembly 20 includes a float valve 46, an upright float valve housing 48, a lift arm 50 operatively coupled to the float valve 46, and a float 52 coupled to the free end of the lift arm 50. In one embodiment, such as shown in FIG. 9, the lift arm 50 is indirectly and operatively coupled to the float valve 46 through a push rod 54 located within the float valve housing 48. The lift arm 50 is movably and pivotably coupled to the float valve 46 (directly or indirectly) such that the float 52 sits on the surface of the water 42 within the reservoir 14 and rises and falls with the water level. If the water level drops, the float 52 lowers with the water level and causes the float valve 46 to open to allow water to flow into the reservoir 14. When the water level reaches a pre-determined shut-off level, the float valve 46 closes. In one embodiment, the float valve housing 48 is coupled to and extends upward from the reservoir floor 36 at a location that is proximate, but not within, the water collection basin 28, whereas the float 52 is located on the surface of the water 42 within the water collection basin 28. However, in other embodiments the float valve housing 48 is coupled to and extends upward from the reservoir floor 36 at a location that is within the water collection basin 28. Further, although the float valve assembly 20, drain valve 24, and the pump 22 are referred to as being located within the water collection basin 28, it will be understood that in some embodiments these components are coupled to or located in contact with the floor 36 of the reservoir 14 within the water collection basin 28, but that at least a portion may extend above the surface of the water 42 within the water collection basin 28. It will also be understood that although the at least one sensor 26 is referred to as being located within the water collection basin 28, the at least one sensor 26 may be entirely or partially submerged within, in contact with the surface of, or proximate the surface of water 42 within the water collection basin 28. Still further, although water 42 may be referred to as being within the water collection basin 28, it will be understood that the water 42 may also be distributed to other areas of the reservoir 14 and is not necessarily entirely confined to the water collection basin 28.

Continuing to refer to FIGS. 2-5, the water collection basin 28 allows the first end 30 of the reservoir 14 to contain a greater volume of water 42 than the second end 32 of the reservoir 14. As the drain valve 24, the pump 22, and the at least one sensor 26 are located within the water collection basin 28, these components are positioned to effectively interact with the water 42 within the reservoir 14. For example, the drain valve 24 may more efficiently remove water 42 from the reservoir 14 because its location allows it to remain in fluid communication with the water 42 even as the total volume of water 42 in the reservoir 14 is reduced. Put another way, the first end 30 of the reservoir 14 may contain water 42 even when the second end 32 of the reservoir 14 is dry and, therefore, the drain valve 24 remains in fluid communication with the remaining amount of water 42. The pump 22 likewise remains in fluid communication with the water 42 (or remaining amount of water 42) and can continue efficiently circulating water through the system. Further, the float valve assembly 20 is positioned and configured such that the float 52 remains in contact with the surface of the water 42 within the water collection basin 28.

Referring now to FIGS. 6 and 7, cross-sectional views of the reservoir 14 and components of the evaporative cooler 10 are shown, demonstrating the effect of mounting angle of the reservoir 14 on water level within the reservoir 14. When the reservoir 14 is mounted to a roof 18 having a slope, the first end may be positioned closer to the eave or edge 56 of the roof 18 and the second end may be positioned closer to the apex 58 of the roof. Therefore, at a non-horizontal mounting angle, the first end 30 of the reservoir 14 is below, or closer to the ground than, the second end 32 of the reservoir 14. As the water collection basin 28 is within the first end 30 of the reservoir 14, water 42 within the reservoir 14 will pool within the water collection basin 28. If one imagines the transition of the reservoir 14 between a mounting angle of approximately 10° (as shown in FIG. 6) and approximately 40° (as shown in FIG. 7), it can be seen that the water collection basin 28 serves as an axis of rotation 44. Therefore, regardless of the mounting angle for at least mounting angles between approximately 10° (±5°) and approximately 40° (±5°), the water collection basin 28 will contain more water 42 than any other portion of the reservoir 14. Therefore, positioning the drain valve 24, pump 22, sensor(s) 26, and float 52 within and/or aligned with the water collection basin 28 will allow for efficient and accurate water management regardless of mounting angle, and avoids the problems of currently known systems, namely, inaccurate water management leading to wasted water, overflow, leaks, and/or inefficient cooling.

Figure 8:
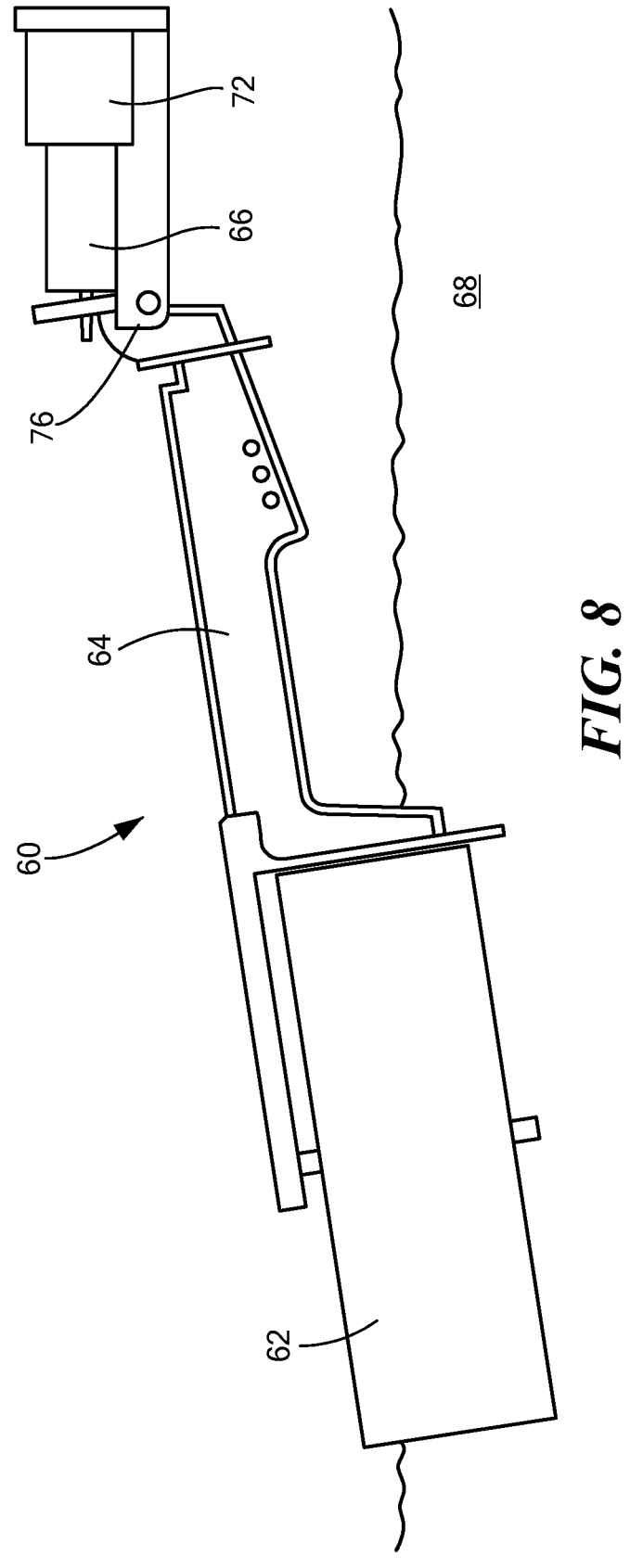
FIG. 8 shows a currently known float valve assembly.
Figures 10, 11:
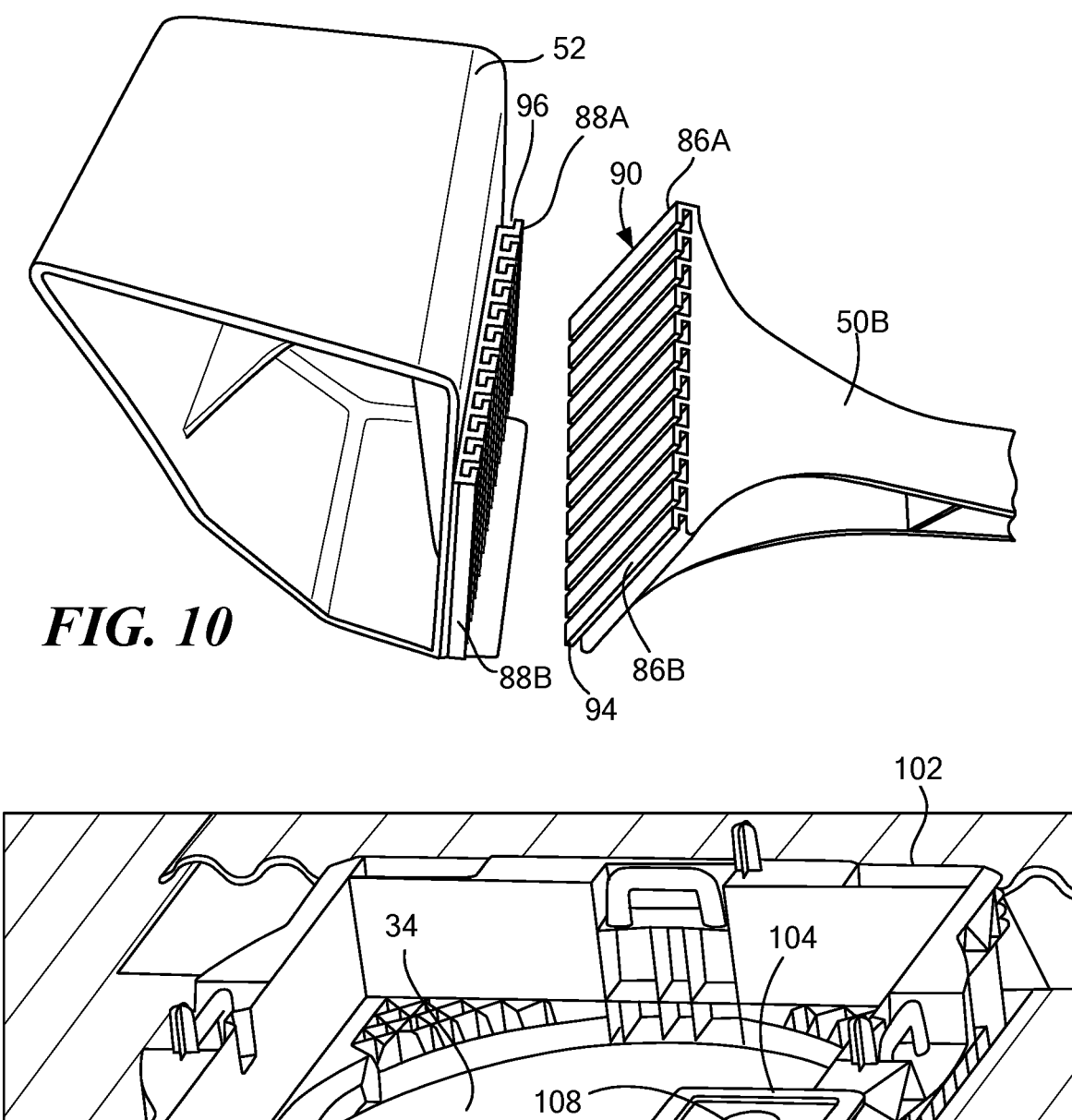
FIG. 10 shows a detailed view of an attachment mechanism between a float and a lift arm of the float valve assembly of FIG. 9 in accordance with the present disclosure.
FIG. 11 shows a first step in an installation of an evaporative cooler in accordance with the present disclosure.

Referring now to FIGS. 8-10, a currently known float valve assembly 60 is shown in FIG. 8 and an exemplary float valve assembly 20 in accordance with the present disclosure is shown in FIGS. 9 and 10. As shown in FIG. 8, currently known float valve assemblies 60 generally include a float 62 coupled to a lift arm 64, and the lift arm 64 is pivotably coupled to a float valve 66. The float valve 66 may be a slide valve that includes a cylinder that slides horizontally along a track to selectively open and close the valve, depending on movement of the lift arm 64. The float 62, which follows the water level, falls as the amount of water 68 in the reservoir 70 is reduced (or as the mounting angle of the reservoir 70 changes and draws water 68 to a location away from the float 62). The downward movement of the lift arm 64 acts against the float valve 66 to open the float valve 66 and to allow water 68 (such as reticulated or piped water) to pass through the float valve 66 and into the reservoir 70. Conversely, as the water level rises, the float 62 also rises and the upward movement of the lift arm 64 acts against the float valve 66 in an opposite direction to close the float valve 66 and prevent the passage of water therethrough.

Continuing to refer to FIG. 8, the float valve 66 is located within a float valve housing 72. The float valve housing 72 is mounted to an interior wall of the evaporative cooler housing 74 or other surface of the evaporative cooler such that the pivot coupling 76 between the lift arm 64 and the float valve 66 is at a location that is a predetermined distance above the maximum water level within the reservoir 14 (that is, the water line at the pre-determined shut-off level). This ensures there is a physical separation between the float valve 66, or at least the inlet of the float valve 66, and the water 68 within the reservoir 70 to avoid possible backflow contamination of the reticulated water supply. However, as the pivot coupling 76 between the lift arm 64 and the float valve 66 is located above the water line, the currently known design makes operation of the float valve 66 highly dependent on mounting angle of the reservoir 70. Further, the typical location at which the float valve housing 72 is mounted to, for example, the interior wall of the evaporative cooler 74 might not provide enough physical separation between the inlet of the float valve 66 and the water level at all mounting angles. For example, a more extreme mounting angle (such as 40°) may cause enough water 68 to collect within the reservoir 70 at a location near the float valve 66 that the water level meets or exceeds the inlet of the float valve 66. Additionally, at such mounting angle the float valve 66 may register a higher water level than is actually present and an insufficient supply of water 68 will be delivered (that is, the float 62 rises to an artificially high level and prematurely shuts off the float valve 66). Thus, the mounting height, lift arm length and/or angle, and/or other factors would have to be considered and compensated for in each installation.

Referring now to FIG. 9, a cross-sectional view of the float valve assembly 20 in accordance with the present disclosure is shown. Unlike currently known systems, in one embodiment the float valve 46 includes a plunger 78 attached to a push rod 54. In one embodiment, the push rod 54 includes a first end 54A and a second end 54B. In one embodiment, the plunger 78 is attached to or integrated with the second end 54B and the lift arm 50 is pivotably connected to the first end 54A at a pivot coupling 80 (pivot point). Movement of the lift arm 50 acts upon the push rod 54 to raise or lower (that is, move vertically or at least substantially vertically) the plunger 78 toward or away from the valve seat 82 and, thereby, to stop or allow the flow of water through the float valve 46. In one embodiment, the plunger 78, push rod 54, and valve seat 82 are located within an upright float valve housing 48.

Continuing to refer to FIG. 9, in one embodiment the float valve housing 48 includes a first end 48A, a second end 48B opposite the first end 48A, a length therebetween, and a longitudinal axis 84 extending along the length. In one embodiment, the push rod 54 and plunger 78 move along the longitudinal axis 84 of the float valve housing 48 with pivotal movement of the lift arm 50 at the pivot coupling 80. In one embodiment, the first end 48A of the float valve housing 48 is configured to be at or proximate the water line when the float valve 46 is installed in the evaporative cooler 10, regardless of the mounting angle of the evaporative cooler 10. In one non-limiting example, the first end 48A of the float valve housing 48 is configured to be located at or below the water line when installed in the evaporative cooler 10, even when the evaporative cooler 10 is mounted at an angle of between approximately 10° (±) 5° and approximately 40° (±) 5°. In one embodiment, the pivot coupling 80 between the lift arm 50 and the push rod 54 is located at or proximate the first end 48A of the float valve housing 48, thereby providing a pivot point that is at or proximate the water line when the float valve 46 is installed in the evaporative cooler 10. Further, the pivot coupling 80 is offset from the longitudinal axis 84 of the float valve housing 48A. At this location of the pivot coupling 80, the lift arm 50 and, therefore, the action of the push rod 54, is not as affected by the mounting angle of the evaporative cooler 10 as in currently known systems. Thus, the float level (position of the float 52 relative to the float valve housing 48 at the shut-off position when the evaporative cooler 10 is installed)

may be reliably adjusted for the mounting angle without the extra complication of adjusting the mounting height of the float valve 46 and float valve housing 48, angle of the lift arm 50, and/or other characteristics to compensate for even small changes in mounting angle.

Referring now to FIG. 10, an attachment mechanism between the float 52 and the lift arm 50 of the float valve assembly 20 of FIG. 9 is shown. In some embodiments, position of the float 52 relative to the lift arm 50 may be adjusted. That is, unlike currently known float assemblies 60 in which the float 62 is permanently attached to the lift arm 64 and/or in which the float 62 may be coupled to the lift arm 64 at only one relative location, the float valve assembly 20 of the present disclosure allows for easy removal of the float 52 from the lift arm 50 and adjustment of height/position of the float 52 relative to the lift arm 50. As shown in FIG. 10, in one embodiment the lift arm 50 includes at least one engagement element 86 and the float 52 includes at least one engagement element 88 complementary to the at least one engagement element 86 on the lift arm 50. The lift arm 50 includes a first or proximal end 50A, a second or distal end 50B opposite the first end 50A, and a length therebetween. In one embodiment, the first end 50A is pivotably coupled to the first end 54A of the push rod 54 of the float valve 46 and the second end 50B is removably coupled to the float 52. Further, in one embodiment the second end 50B of the lift arm 50 defines a distal face 90 that lies in a plane that is orthogonal to, or at least substantially orthogonal to, a longitudinal axis 92 of the lift arm 50 proximate the second end 50B. In one embodiment, the at least one engagement element 86 of the lift arm 50 includes a first plurality of elongate engagement elements 86, each of which extending a length over the distal face 90 of the second end 50B of the lift arm 50. Additionally, in one embodiment, each of the first plurality of engagement elements 86 has an inverted, angular trough shape with a downward-facing free edge 94 (as shown in FIG. 10).

Continuing to refer to FIG. 10, in one embodiment the float 52 includes a second plurality of elongate engagement elements 88, each of which extending a length over a surface of the float 52 that is closest to the distal face 90 of the second end 50B of the lift arm 50. In one embodiment, each of the second plurality of engagement elements 88 has an angular trough shape with an upward-facing free edge 96 that is complementary to the downward facing free edge 94 of a corresponding one of the first plurality of engagement elements 86. Thus, the engagement elements 88 of the float 52 and the engagement elements 86 of the lift arm 50 are configured to be removably coupled to each other and to secure the float 52 to the lift arm 50. Further, the corresponding engagement elements 86, 88 may be altered to adjust the position of the float 52 relative to the lift arm 50. For example, the float 52 would have a maximum height relative to the lift arm 50 when the lowermost engagement element 88B of the float 52 is engaged with the uppermost engagement element 86A of the lift arm 50. Likewise, the float 52 would have a minimum height relative to the lift arm 50 when the uppermost engagement element 88A of the float 52 is engaged with the lowermost engagement element 86B of the lift arm 50. Similarly, the float 52 may have any of a number of intermediary heights between the maximum and minimum heights (for example, as shown in FIG. 10). Although the engagement elements 86, 88 are described herein as having angular trough shapes, it will be understood that the engagement elements 86, 88 may be of any suitable number and may have any suitable size, shape, and/or configuration that allows the float 52 to be removed from the lift arm 50 and the height of the float 52 adjusted.

Figure 12:
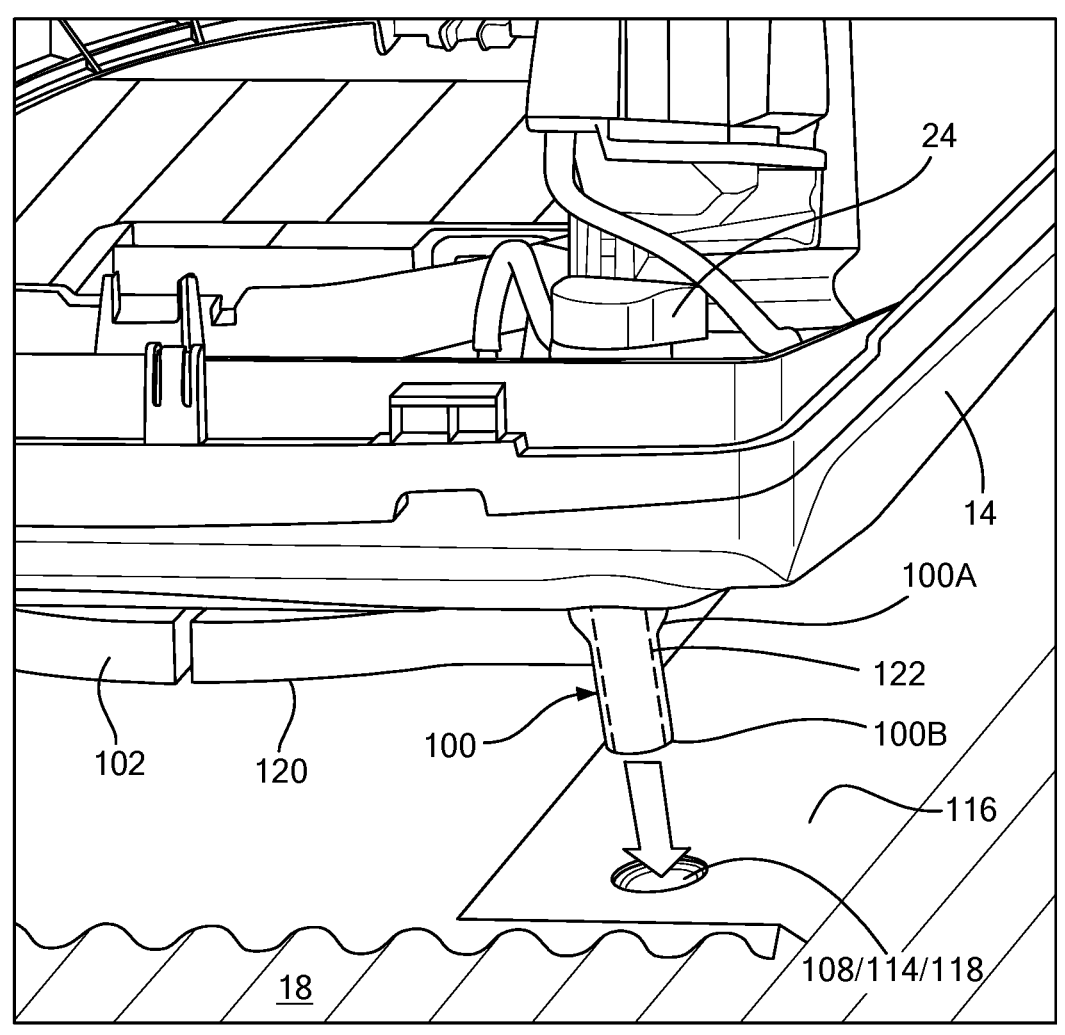
FIG. 12 a shows a second step in an installation of an evaporative cooler in accordance with the present disclosure.
Figure 13:
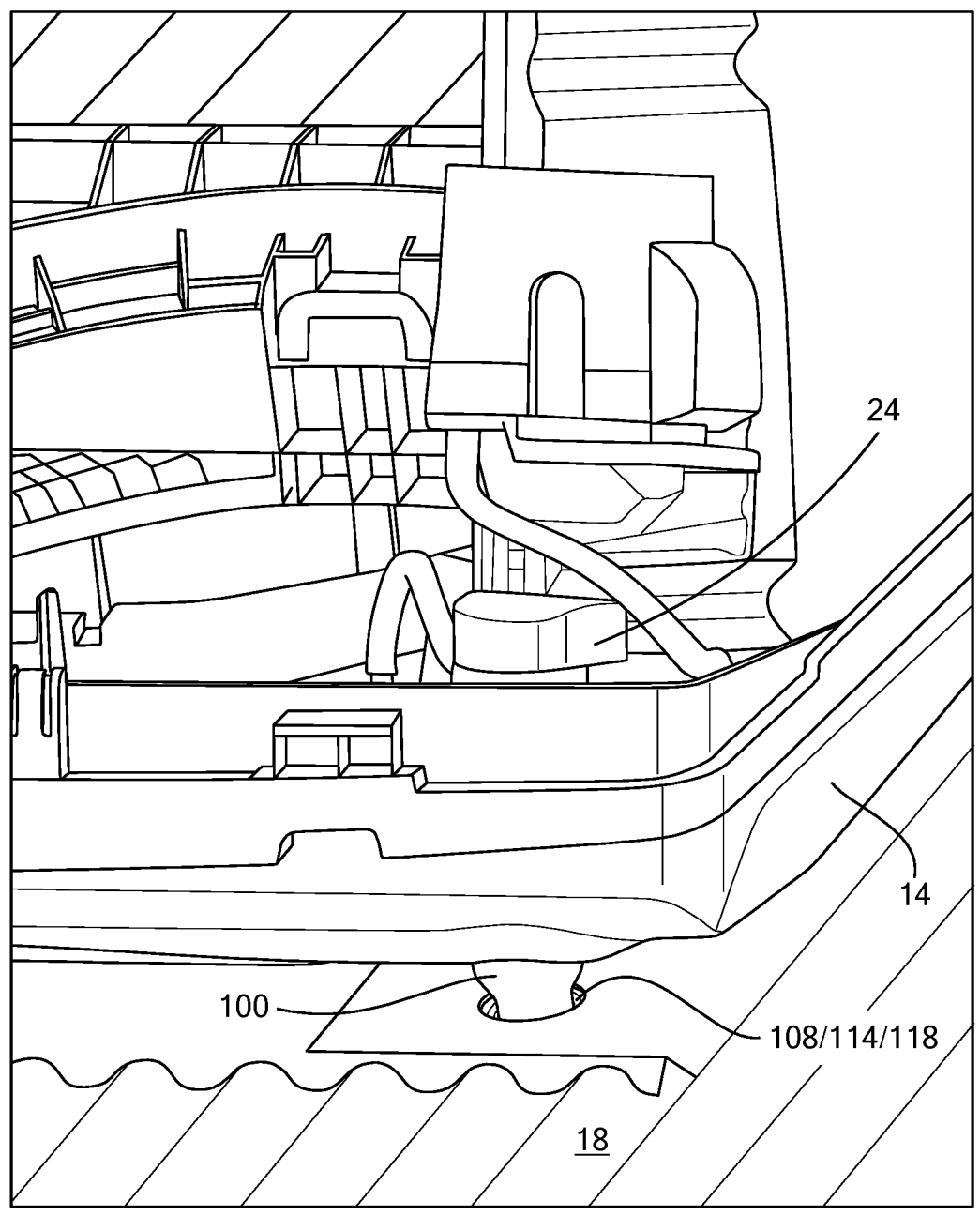
FIG. 13 shows a third step in an installation of an evaporative cooler in accordance with the present disclosure.

Referring now to FIGS. 11-13, steps of a method of installing an evaporative cooler 10 are shown. The steps shown and described herein allow for rapid drain coupling and eliminate the need to have an on-roof or exposed drain pipe by providing an integrated seal and aligned coupling of the reservoir to the roof. An exemplary first step, as shown in FIG. 11, generally includes securing and sealing a roof tube assembly 98 to the roof 18. An exemplary second step, as shown in FIG. 12, generally includes attaching a flexible drain outlet 100 to a reservoir 14 of an evaporative cooler 10. An exemplary third step, as shown in FIG. 13, generally includes lowering the reservoir 14 of the evaporative cooler 10 onto a dropper 102 installed within the roof 18 and feeding the flexible drain outlet 100 into the roof tube assembly 98.

Referring to FIG. 11, in one embodiment the first step includes securing and sealing a roof tube assembly 98 to the roof 18 or other surface to which the evaporative cooler 10 will be mounted. In one embodiment, the roof tube assembly 98 includes a flange 104 and a flexible tube 106 extending from the flange 104. In one embodiment, the flange 104 is planar, or at least substantially planar, and includes an upper surface, a lower surface (which is configured to be in contact with the roof surface), and an aperture 108 extending therebetween. The flange 104 may be composed of a rigid, semi-rigid, and/or flexible material that will not cause damage to the roof surface, such as by friction (for example, natural rubber, ethylene propylene diene monomer (EPDM) rubber, plastics, or the like). In one embodiment the flexible tube 106 is tubular, or at least substantially tubular, with a first end 106A coupled to, meeting, or extending from the lower surface of the flange 104, a second end 106B opposite the first end 106A, and a lumen 110 extending therebetween. The lumen of the flexible tube 106 is in communication with the aperture 108 of the flange 104 and the second end 106B of the flexible tube 106 is open. In one embodiment, the flexible tube 106 is composed of a flexible material such as silicone, natural rubber, flexible polyvinyl chloride (PVC), neoprene rubber, or the like. The flange 104 and the flexible tube 106 may be composed of the same material or different materials. In one embodiment, the flexible tube 106 is composed of a different, more flexible material than the material from which the flange 104 is composed. Further, in some embodiments the flexible tube 106 also includes one or more flanges, ribs, or other features 112 to facilitate engagement of the flexible tube 106 within the aperture 108 and/or to prevent the entry of water and/or debris through the aperture 108 and into the roof 18. In one embodiment, the flange 104 has a maximum diameter that is greater than a maximum outer diameter of the flexible tube 106. The flange 104 and flexible tube 106 may be manufactured together as a single, integrated, inseparable piece, or the flange 104 and the flexible tube 106 may be permanently or removably coupled to each other.

Continuing to refer to FIG. 11, the flexible tube 106 is inserted into an aperture 114 through the roof. The roof aperture 114 may have a diameter that is only slightly greater than the maximum outer diameter of the flexible tube 106 and that is less than the maximum diameter of the flange 104. For example, the flexible tube 106 and the roof 114 aperture may be sized and configured such that the flexible tube 106 is friction fit with the roof aperture 114 and water and/or debris cannot enter the roof through the aperture. Further, the flange 104 and the roof aperture 114 may be sized and configured such that the flange 104 cannot pass through the roof aperture 114 (and also helps prevent the entry of water and/or debris into the roof aperture 114) and the flexible tube 106 remains suspended into the roof 18 from the flange 104. When the roof tube assembly 98 is installed, the flange 104 may be flush, or at least substantially flush, with the roof surface. Optionally, a roof panel or other covering material 116 may be placed over the flange 104, but with an aperture 118 that is aligned with, or otherwise does not obstruct, the aperture 108 in the flange 104 (for example, as shown in FIG. 12). The aligned aperture 108 in the flange 104, roof aperture 114, and aperture 118 in the cover material 116 are shown in FIGS. 12 and 13 collectively as 108/114/118. It will also be understood that use of the cover material 116 is optional and, as such, the cover material 116 may not be used in all embodiments. Further, other roofing materials and/or additional surface components may be used other than those shown and described herein. Additionally, a second aperture 120 may be made in the roof 18 and a dropper 102 installed therein for mounting of the evaporative cooler 10. As shown in FIG. 10, the apertures 114, 120 are positioned such that the roof tube assembly 98 is located a predetermined distance from the dropper 102. In one non-limiting example, the predetermined distance is based on the size of the reservoir 14 of the evaporative cooler 10 being installed and/or the location of the drain from the reservoir 14 (for example, the outlet of the drain valve 24).

Referring to FIG. 12, in one embodiment the second step includes attaching a flexible drain outlet 100 to a reservoir 14 of an evaporative cooler 10 and positioning the reservoir 14 such that the flexible drain outlet 100 is aligned with the aperture 108 of the flange 104 and the lumen 110 of the flexible tube 14. In one embodiment, the flexible drain outlet 100 has a tubular shape and generally includes a first end 100A configured to be coupled to the reservoir 14, an open second end 100B, and a lumen 122 therebetween. In one embodiment, the reservoir 14 includes a drain aperture (not shown) and the first end 100A of the flexible drain outlet 100 is coupled to the drain aperture of the reservoir 14 such that the flexible drain outlet 100 extends downward from (that is, toward the roof 18) the reservoir 14 and the lumen 122 of the flexible drain outlet 100 is in communication with the interior of the reservoir 14. The flexible drain outlet 100 may be attached to the reservoir 14 using such means as chemical welding, thermal bonding, friction fit, adhesives, mechanical coupling elements (such as clamps, retaining rings, clips, or the like). In one embodiment, the flexible drain outlet 100 is composed of a flexible material such as silicone, natural rubber, flexible polyvinyl chloride (PVC), neoprene rubber, or the like. Once the flexible drain outlet 100 is attached to the reservoir 14, the reservoir 14 may be positioned such that the flexible drain outlet 100 is aligned with the roof aperture 114 (as shown in FIG. 12).

Referring to FIG. 13, in one embodiment the third step includes lowering the reservoir 14 toward to roof 18 and inserting the flexible drain outlet 100 into the roof tube assembly 98. For example, the flexible drain outlet 100 is inserted through the aperture 108 of the flange 104 and at least partially into the lumen 110 of the flexible tube 106. The reservoir 14 may then be mounted and secured to the dropper 102. The flexibilities of the flexible drain outlet 100 and the flexible tube 106 allow the reservoir 14, and therefore the evaporative cooler 10, to be mounted to the roof 18 at any of a variety of angles (for example, between approximately 10° (±5°) and approximately 40° (±5°)) without having to make precise measurements and calculations to create the roof aperture 114 according to the specific mounting angle of the evaporative cooler 10. Additionally, the flexible drain outlet 100 is easily guided into the roof tube assembly 98 and the reservoir 14 may be seated on the dropper 102 without having to precisely lower a rigid drain outlet into a rigid roof rube at a particular mounting angle. After the reservoir 14 is secured to the dropper 102, assembly of the evaporative cooler 10 onto the reservoir 14 may then be completed.

Figure 14:
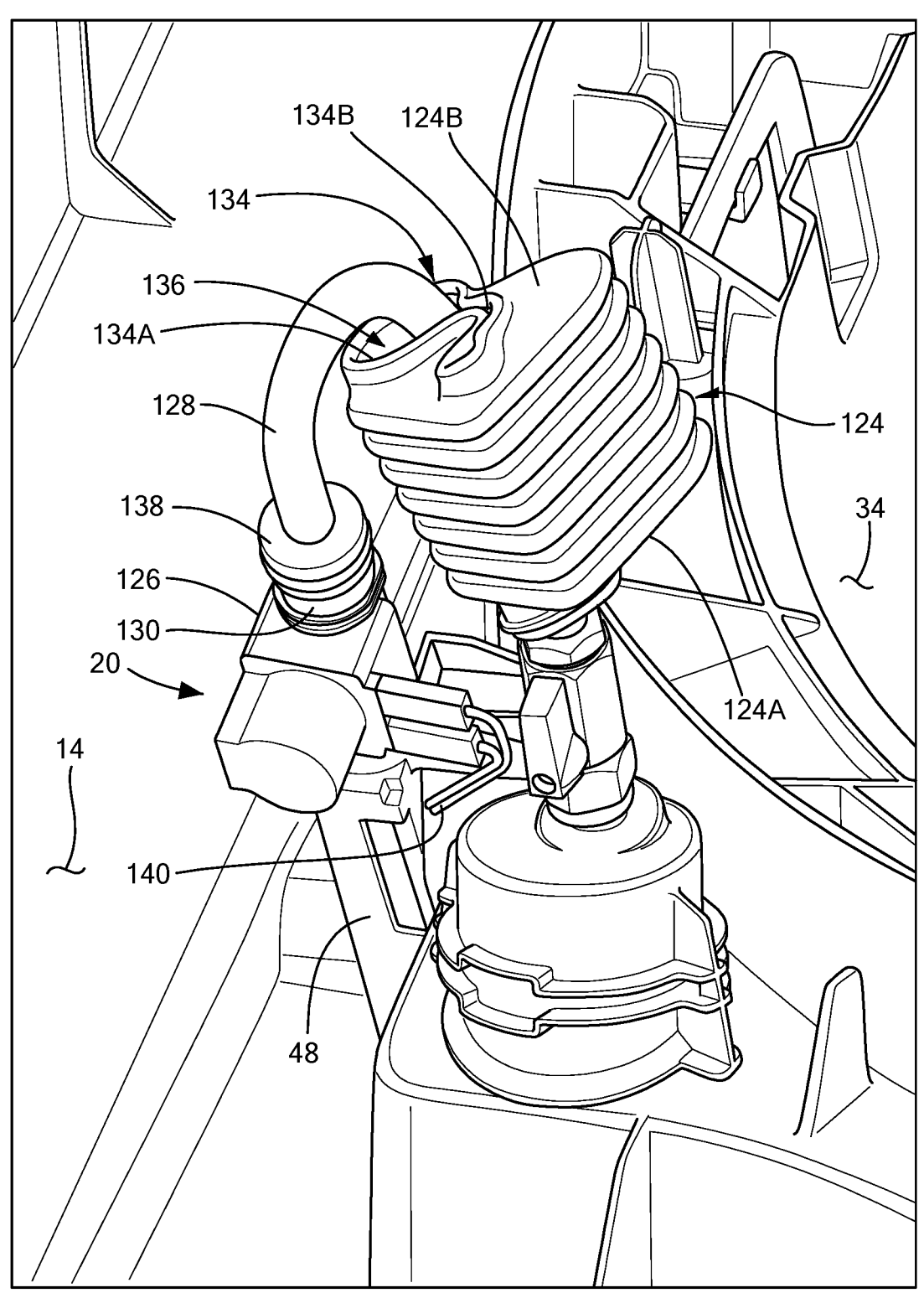
FIG. 14 shows a solenoid valve shroud for use in an evaporative cooler in accordance with the present disclosure, the solenoid shroud being in an installation first position.
Figure 15:
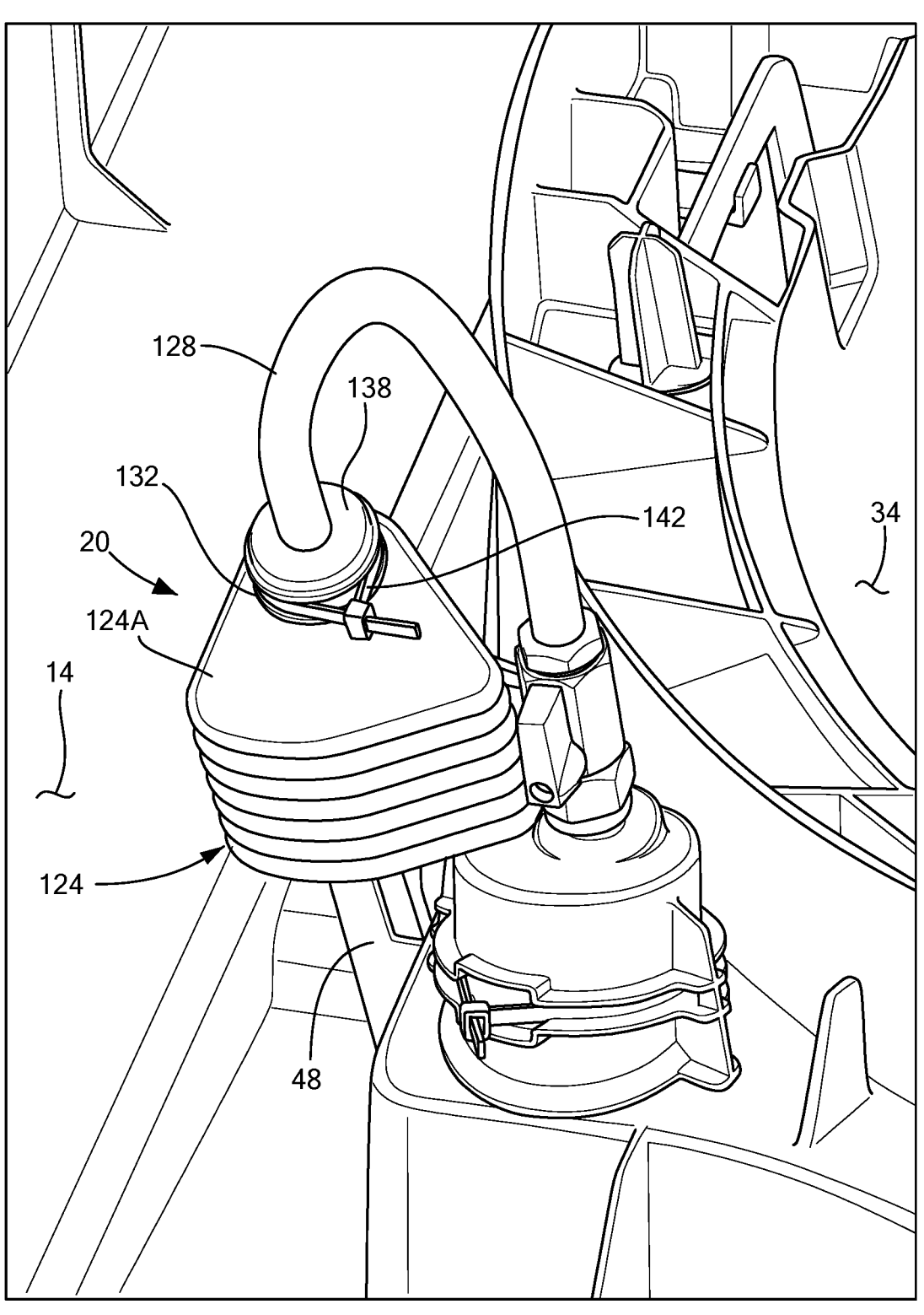
FIG. 15 shows the solenoid valve shroud of FIG. 14 in accordance with the present disclosure, the solenoid shroud being in a final second position.

Referring now to FIGS. 14 and 15, a solenoid valve shroud 124 for use in an evaporative cooler 10 is shown. FIG. 14 shows the solenoid valve shroud 124 in an installation first position and FIG. 15 shows the solenoid valve shroud 124 in a final second position. In one embodiment, an evaporative cooler 10 includes a solenoid valve 126 for controlling the entry of water 42 into the evaporative cooler 10, and the solenoid valve 126 is coupled to and in fluid communication with the float valve 46. In one embodiment the solenoid valve 126 is remotely activated to selectively allow or prevent the delivery of reticulated water 42 to the evaporative cooler 10. For example, in some embodiments, when the solenoid valve 126 is activated or configured to allow the entry of water (which, in some embodiments, is the default condition), water is available for delivery through the float valve 46 into the reservoir 14 as discussed above. In some embodiments, when the solenoid valve 126 is deactivated or configured to prevent the entry of water, no water will be delivered to the reservoir 14, regardless of the position of the float 52 (that is, even if the float valve 46 is opened by lowering of the float 52 and lift arm 50). For example, it may be desirable to deactivate the solenoid valve 126 when draining the reservoir 14 for service or removal, when the evaporative cooler 10 will not be in use for extended periods of time, or for other reasons. However, it is not uncommon for the solenoid valve 126 and/or water supply line 128 to split or break due to, for example, ice expansion in the water supply line 128. If the solenoid valve 126 fails, water may be released from the solenoid valve 126 and/or water supply line 128, and this water may undesirably enter the air stream being blown through the dropper aperture 34 and into the building to which the evaporative cooler 10 is mounted. The solenoid valve shroud 124 shown and described herein contains and directs water 42 into the reservoir 14 and/or away from the dropper 102 aperture and directed airflow.

Referring to FIG. 14, the solenoid valve shroud 124 is shown in a first position during installation (referred to herein as an "installation first position"). In one embodiment, a flexible water supply line 128 is fed through the solenoid valve shroud 124 and coupled to an inlet 130 of the solenoid valve 126. In one embodiment, the solenoid valve shroud 124 includes a first end 124A having a first aperture 132 (shown in FIG. 15), a second end 124B opposite the first end 124A and having a second aperture 134, and an internal chamber 136. In one embodiment, the water supply line 128 is passed into the solenoid valve shroud 124 though the first aperture 132, passes through the internal chamber 136, exits the solenoid valve shroud 124 through the second aperture 134, and is then coupled to the inlet 130 of the solenoid valve 126. In the installation first position, the solenoid valve shroud 124 is uncoupled from the solenoid valve 126.

Continuing to refer to FIG. 14, in one embodiment the first aperture 132 of the solenoid valve shroud 124 has a circular, or at least substantially circular, shape and has a diameter that is sized and configured to fit in close tolerance around the water supply line 128 and/or a coupling 138 between the water supply line 128 and the solenoid valve 126 (for example, as shown in FIG. 15). Further, in one embodiment the second aperture 134 has a primary portion 134A having a circular, or at least substantially circular, shape and an extension portion 134B that is shaped as a bent slit (for example, as shown in FIG. 14). In one embodiment, the primary portion 134A of the second aperture 134 is sized and configured to fit over the solenoid valve 126 and the extension portion 134B is sized and configured to pass over wires 140 connected to the solenoid valve 126. Further, the second aperture 134 is sized and configured to allow water released within the solenoid valve shroud 124 to fall by gravity through the second aperture 134 and into the reservoir 14 and/or away from the directed air stream. However, it will be understood that the first and second apertures 132, 134 may have any size, shape, and/or configuration that allows the solenoid valve shroud 124 to be used with the water supply line 128, solenoid valve 126, and/or other components of the evaporative cooler 10.

Referring to FIG. 15, the solenoid valve shroud 124 is shown in a second position after installation (referred to herein as a "final second position"). In one embodiment, the solenoid valve shroud 124 rests at the top of the float valve housing 48 and encases the solenoid valve 126. To complete installation, the solenoid valve shroud 124 is fed over the water supply line 128 and over the solenoid valve 126. In some embodiments, the water supply line 128 is coupled to the solenoid with a nut 138. In this embodiment, the first aperture 132 of the solenoid valve shroud 124 is positioned around the nut 138 and secured with a cable tie or other fastening mechanism 142. Thus, when the solenoid valve shroud 124 is in the final second position, the solenoid valve 126 is at least partially located within the internal chamber 136. If the solenoid valve 126 and/or the portion of the water supply line 128 coupled to and/or proximate the solenoid valve 126 ruptures or otherwise fails, any released water 42 will be at released within the solenoid valve shroud 124 and directed downward by gravity into the reservoir 14 and/or away from the directed air stream.

In one embodiment, a reservoir (14) for an evaporative cooler (10) includes: a water collection basin (28); a float valve assembly (20) including a float valve housing (48), a float valve (46), a lift arm (50) pivotably coupled to the float valve (46), and a float (52) coupled to the lift arm (50); a pump (22); and a drain valve (24), the pump (22) and the drain valve (24) each being within the water collection basin (28).

In one aspect of the embodiment, the water collection basin (28) is elongate and extends from a first edge of the reservoir (14) to a second edge of the reservoir (14) opposite the first edge, the water collection basin (28) having a width of approximately 140 mm.

In one aspect of the embodiment, the reservoir (14) includes a first end (30) and a second end (32) opposite the first end (30), the first end (30) being configured to be closer to an edge (56) of a roof (18) when the reservoir (14) is mounted to the roof (18) and the second end (32) being configured to be closer to an apex (58) of the roof (18) when the reservoir (14) is mounted to the roof (18), the water collection basin (28) extending along the first end (30).

In one aspect of the embodiment, the water collection basin (28) lies along an axis of rotation (44) of the reservoir (14), the water collection basin (28) being configured to contain a volume of water (42) when the reservoir (14) is rotated along the axis of rotation (44) to lie at any of a plurality of angles relative to horizontal.

In one aspect of the embodiment, the plurality of angles includes angles between approximately 10° and approximately 40°.

In one aspect of the embodiment, the float (52) is configured to float on a surface of water (42) within the water collection basin (28).

In one aspect of the embodiment, the float valve housing (48) is coupled to the reservoir (14) at a location proximate the water collection basin (28).

In one aspect of the embodiment, the reservoir (14) further comprises at least one sensor (26) within the water collection basin (28).

In one embodiment, a float valve assembly (20) comprises: a float valve housing (48), the float valve housing (48) including a first end (48A) and a second end (48B) opposite the first end (48A); a float valve (46) within the second end (48B) of the float valve housing (48); a push rod (54) movable within the float valve housing (48), the push rod (54) having a first end (54A) and a second end (54B) opposite the first end (54A); a plunger (78) coupled to the second end (54B) of the push rod (54); a lift arm (50), the lift arm (50) including a first end (50A) pivotably coupled to the first end (54A) of the push rod (54) at a pivot point (80) and a second end (50B) opposite the first end (50A); and a float (52) coupled to the second end (50B) of the lift arm (50), the first end (48A) of the float valve housing (48) being configured to be coupled to a floor (36) of a reservoir (14) such that the pivot point (80) is located at or proximate a surface of water (42) within the reservoir (14).

In one aspect of the embodiment, the float (52) is removably coupled to the second end (50B) of the lift arm (50).

In one aspect of the embodiment, the second end (50B) of the lift arm (50) includes a first plurality of engagement elements (86) and the float (52) includes a second plurality of engagement elements (88) complementary to the first plurality of engagement elements (86).

In one aspect of the embodiment, each of the first plurality of engagement elements (86) has a trough shape with a free edge (94) extending in a first direction and each of the second plurality of engagement elements (88) has a trough shape with a free edge (86) extending in a second direction opposite the first direction.

In one aspect of the embodiment, the float valve assembly (20) further comprises: a solenoid valve (126) in fluid communication with the float valve (46); and a solenoid valve shroud (124) positionable over the solenoid valve (126).

In one aspect of the embodiment, the solenoid valve shroud (124) includes: a first end (124A) having a first aperture (132); a second end (124B) opposite the first end (124A) and having a second aperture (134); and an internal chamber (136).

In one aspect of the embodiment, the second aperture (134) is sized to pass over the solenoid valve (126) to at least partially enclose the solenoid valve (126) within the internal chamber (136), the solenoid valve shroud (124) being configured to direct a flow of water toward the reservoir (14).

It will be appreciated by persons skilled in the art that the present invention is not limited to what has been particularly shown and described hereinabove. Additionally, unless mention was made above to the contrary, it should be noted that all of the accompanying drawings are not necessarily to scale. A variety of modifications and variations are possible in light of the above teachings without departing from the scope and spirit of the invention, which is limited only by the following claims.

What is claimed is:

1. A reservoir for an evaporative cooler, the reservoir having a width and a floor and including:

a first end and a second end opposite the first end, the first end being configured to be closer to an edge of a roof when the reservoir is mounted to the roof and the second end being configured to be closer to an apex of the roof when the reservoir is mounted to the roof;

an outer wall, the outer wall including a first wall portion, a second wall portion opposite the first wall portion, a third wall portion extending between the first and second wall portions, and a fourth wall portion opposite the third wall portion and extending between the first and second wall portions, the first wall having a height that is greater than a height of the second wall portion, the first wall portion being at the first end of the reservoir and the second wall portion being at the second end of the reservoir;

a water collection basin, having a width that is less than the width of the reservoir and a length, the water collection basin extending along the first end of the reservoir;

a float valve assembly including a float valve housing having a longitudinal axis, a float valve, a lift arm pivotably coupled with a pivot coupling at a first end of the lift arm to the float valve, and a float coupled to a second end of the lift arm, the pivot coupling being offset from the longitudinal axis of the float valve housing in a direction away from the second end of the lift arm;

a pump; and a drain valve, the water collection basin lying along an axis of rotation of the reservoir relative to horizontal and that extends longitudinally across the floor of the reservoir in the water collection basin and along the length of the water collection basin, the pump, the float, and the drain valve being within the water collection basin and horizontally aligned along the axis of rotation of the reservoir.

2. The reservoir of claim 1, wherein the water collection basin is elongate and extends from a first edge of the reservoir to a second edge of the reservoir opposite the first edge, wherein the width of the water collection basin is approximately 140 mm.

3. The reservoir of claim 1, wherein the water collection basin being configured to contain a volume of water when the reservoir is rotated along the axis of rotation to lie at any of a plurality of angles relative to horizontal.

4. The reservoir of claim 3, wherein the plurality of angles includes angles between approximately 10° and approximately 40°.

5. The reservoir of claim 1, wherein the float is configured to float on a surface of water within the water collection basin.

6. The reservoir of claim 5, wherein the float valve housing is coupled to the reservoir at a location proximate the water collection basin.

7. The reservoir of claim 1, further comprising at least one sensor within the water collection basin.

* * * * *